UNITED STATES PATENT OFFICE.

ROBERT R. ROBERTS, OF BONHAM, TEXAS.

IMPROVEMENT IN MEDICAL COMPOUNDS.

Specification forming part of Letters Patent No. 149,680, dated April 14, 1874; application filed October 11, 1873.

CASE A.

*To all whom it may concern:*

Be it known that I, Dr. ROBERT R. ROBERTS, of Bonham, in the county of Fannin and State of Texas, have invented a new and useful Improvement in Medical Compound, of which the following is a specification:

This invention and discovery relate to the art of healing; and consist in a compound prepared for use in the form of pills, of about the weight of three grains each, and preferably coated with sugar.

In forming the combination of ingredients, or the mass from which the pills are made, I use, of podophyllin, one-fourth of a grain; leptandrin, one-fourth of a grain; extract of butternut bark, one-fourth of a grain; extract of rhubarb, one-half of a grain; extract of jalap, one-half of a grain; powdered capsicum, one-fourth of a grain; sulphate of quinine, one-fourth of a grain; salicine, three-fourths of a grain.

In forming the mass from the above ingredients gum-arabic and water or other liquid is employed to give it the necessary adhesiveness.

After the ingredients have been thoroughly mixed together and made into a mass the separation is made by the pill-machine, each pill containing about three grains.

After the pills are made they may be coated with sugar; and I prefer to prepare them for use in that way, but do not confine myself to it, nor to the precise proportion named of the ingredients.

These pills operate as a tonic as well as a cathartic, and are successfully employed in the treatment of a great variety of diseases.

Having thus described my invention, I claim as new and desire to secure by Letters Patent—

The above-described compound, substantially as and for the purposes set forth.

ROBERT R. ROBERTS, M. D.

Witnesses:
SETH W. GOULD,
ROBT. DUNCAN.